United States Patent
Hurst, Jr. et al.

(10) Patent No.: US 6,285,710 B1
(45) Date of Patent: Sep. 4, 2001

(54) NOISE ESTIMATION AND REDUCTION APPARATUS FOR VIDEO SIGNAL PROCESSING

(75) Inventors: Robert Norman Hurst, Jr., Hopewell; Jungwoo Lee, Princeton, both of NJ (US)

(73) Assignee: Thomson Licensing S.A., Boulogne (FR)

( * ) Notice: Subject to any disclaimer, the term of this patent is extended or adjusted under 35 U.S.C. 154(b) by 1173 days.

(21) Appl. No.: 08/571,044

(22) Filed: Dec. 12, 1995

Related U.S. Application Data

(63) Continuation-in-part of application No. 08/371,039, filed on Jan. 10, 1995, now Pat. No. 6,115,071, which is a continuation of application No. 08/136,387, filed on Oct. 13, 1993, now abandoned.

(51) Int. Cl.[7] .................................................. H04N 7/32
(52) U.S. Cl. ............... 375/240.12; 348/607; 375/240.18
(58) Field of Search .................... 348/384, 390, 348/402, 404, 405, 407, 409–413, 415, 416, 607, 618, 620, 623, 699, 571; 382/232, 236, 238, 251; 364/553; 375/240.01, 240.03, 240.12–240.16, 240.18, 240.2, 240.24; H04N 7/137, 7/32

(56) References Cited

U.S. PATENT DOCUMENTS

| | | | |
|---|---|---|---|
| 4,194,219 | * 3/1980 | Drewery | 348/620 |
| 4,249,210 | * 2/1981 | Storey et al. | 348/620 |
| 4,689,671 | 8/1987 | Ohki et al. | 358/135 |
| 4,949,176 | 8/1990 | Levy | 358/135 |
| 5,005,082 | * 4/1991 | Zdepski et al. | 348/620 |
| 5,051,826 | * 9/1991 | Ishii et al. | 348/409 |
| 5,095,366 | 3/1992 | Ishikawa | 358/136 |
| 5,161,018 | * 11/1992 | Matsunaga | 348/607 |
| 5,258,928 | 11/1993 | Zdepski et al. | 364/553 |

FOREIGN PATENT DOCUMENTS

| | | | |
|---|---|---|---|
| 346636 | * 12/1989 | (EP) . | |
| 614 312 A2 | 9/1994 | (EP) | H04N/5/21 |
| 649 262 A1 | 4/1995 | (EP) | H04N/7/50 |
| 2196205 | * 4/1988 | (GB) . | |

OTHER PUBLICATIONS

Composite Interframe Coding of NTSC Color Television Signals, by Ishiguro et al., 1976 IEEE National Telecommunications Convference vol. 1, pp. 6.4–1–6.4–5, Nov. 1976.*

A 64 Kbits/s Videophone Codec With Forward Analysis and Control, Signal Processing, Image Communication, vol. 2, No. 2 pp. 103–115, by Grotz et al., Oct. 1989.*

HDTV Coding at Below 45 Mbps for Digital Transmission, Globecom '91–IEEE Global Telecommunications conf. vol. 1/3, IEEE, pp. 96–100, by Chen et al., Dec. 1991.*

N. Hurst et al., In–Loop Coring: Robust MPEG Coding for Noisy Images, International Conference on Consumer Electronics—Digest of Technical Papers, Rosemont, IEEE Conf.14, Jun. 7, 1995, pp. 166–167.

* cited by examiner

*Primary Examiner*—Richard Lee
(74) *Attorney, Agent, or Firm*—Joseph S. Tripoli; Ronald H. Kurdyla; Joel M. Fogelson

(57) ABSTRACT

Video signal compression apparatus generates residues representing pixel value differences between predicted and real pixel values of a current frame of a video signal. Noise reduction circuitry, in the form of nonlinear processing functions, attenuates lower amplitude residues greater than higher amplitude residues and is responsive to a noise estimate. The processed residues are transformed to provide a compressed video data output. The nonlinear processing functions attenuate noise and reduce image distortion.

21 Claims, 4 Drawing Sheets

NOISE ESTIMATION AND REDUCTION APPARATUS FOR VIDEO SIGNAL PROCESSING

This application is a Continuation-In-Part of Continuing application Ser. No. 08/371,039 entitled Video Signal Compression Apparatus Using Noise Reduction, by R. N. Hurst et al, filed Jan. 10, 1995, now U.S. Pat. No. 6,115,071, as a continuation of application Ser. No. 08/136,387, also by R. N. Hurst et al, filed Oct. 13, 1993 now abandoned.

This application relates to noise reduction for video signal processing and compression apparatus, and more particularly to noise reduction apparatus for use within the video signal encoding loop.

BACKGROUND OF THE INVENTION

Predictive coding for compression of video signal functions best when current images are easily predicted from temporally adjacent images. However when the source images contain noise, accurate prediction becomes difficult and the compression efficiency declines or the reproduced image quality degrades or both. It is therefore desirable to minimize noise in the video signal to be compressed prior to the compression process.

Consider FIG. 1 which illustrates a prior art predictive image coding system. Elements 12–22 form the actual predictive coder which will be described herein after. Noise reduction, in such prior art systems typically include a recursive noise reduction filter 10 to preprocess the video signal prior to compression. Field or frame recursive filters tend to have been preferred because they can effectively reduce noise components within the bandwidth of the active signal. However, such filters are also very memory intensive and require relatively sophisticated processing circuitry in order to perform significant noise reduction without introducing undesirable artifacts around moving image features.

It is an object of the present invention to provide a highly effective noise filter apparatus and method for predictive encoders with minimal additional hardware.

SUMMARY OF THE INVENTION

The present invention reduces noise in video signal processing and compression. Video signal compression apparatus includes circuitry for generating residues representing pixel value differences between predicted and real pixel values of a current frame of a video signal. A nonlinear processor attenuates lower amplitude residues greater than higher amplitude residues and is responsive to a noise estimate. The processed residues are transformed to provide a compressed video data output.

In a feature of the invention, nonlinear processing functions are disclosed for noise estimation and for attenuation of noise and reduction of image distortion.

In another feature of the invention, noise estimation functions are disclosed.

DETAILED DESCRIPTION

The present invention will be described in the context of video compression similar to that described in the standard being established by the Moving Picture Experts Group (MPEG) of the International Standardisation Organisation. Motion compensated predictive encoding, of the type described in the MPEG protocol, requires both intraframe encoding and interframe encoding. That is every $N^{th}$ frame is intraframe encoded to insure regular temporal signal replenishment. Intervening frames are interframe or DPCM predictive encoded with compressed data in successive frames dependent upon prior frames. Intraframe encoded frames are designated I frames and interframe encoded frames are designated either P or B frames depending upon whether they are only forward predicted or both forward and backward predicted respectively. The process of predictive coding involves dividing respective images into small areas, and searching neighboring images to locate identical or nearly identical areas in a neighboring image. The location of the area in the neighboring image and the differences between the area of the current image and the corresponding identical or nearly identical area, of the neighboring image, are coded for transmission. Note that if the corresponding areas are in fact identical, all differences will be zero and an area may be coded with simply a vector identifying the location of the corresponding area and a code indicating that all differences are zero. Thus compressed identical or nearly identical images may be realized with relatively few codewords. Alternatively, if the image contains appreciable noise it will be appreciated that correlation of image areas frame to frame will deteriorate with a concomitant increase in residue data, and a corresponding increase in compressed codewords.

Figure 1:
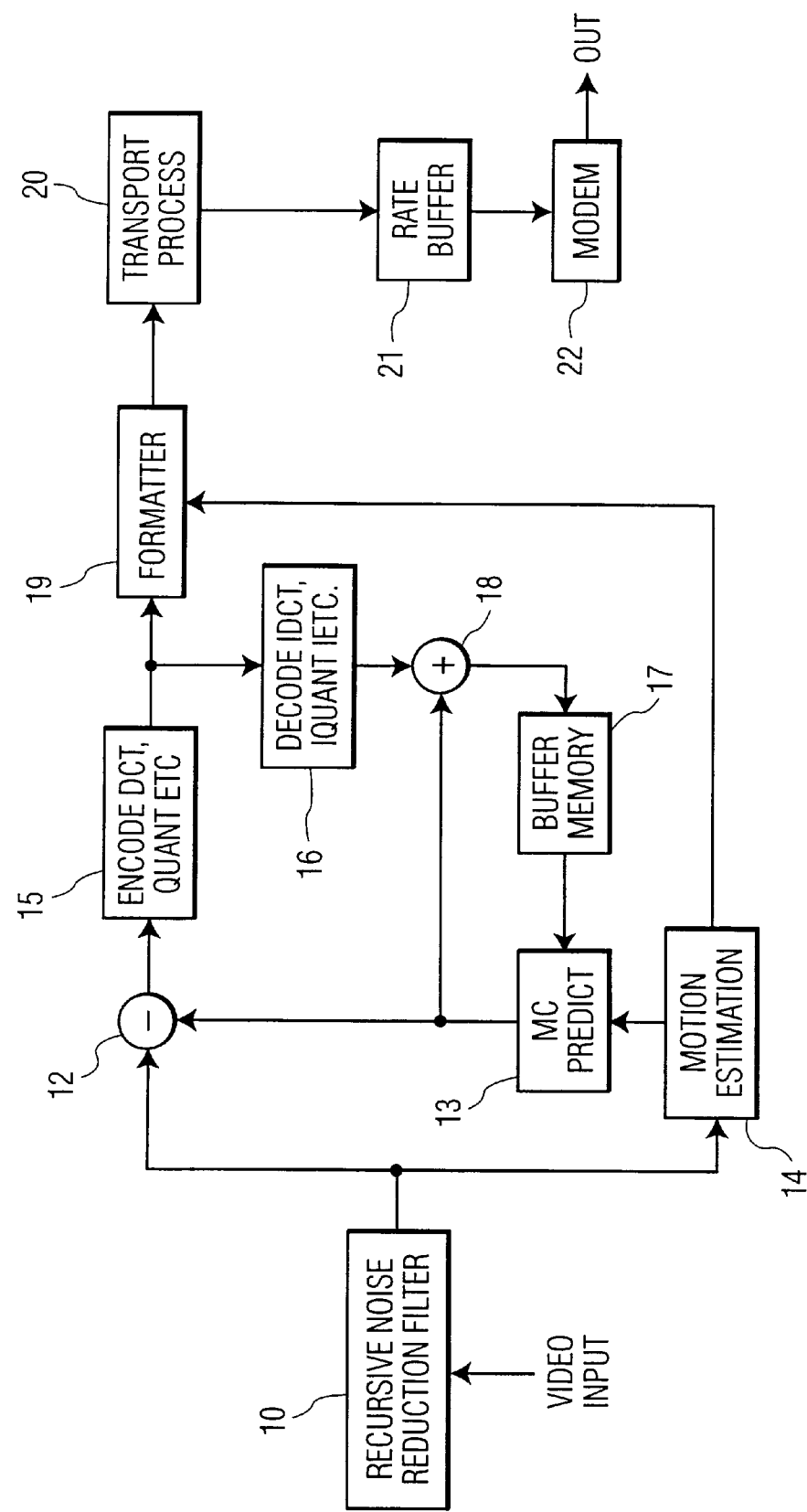
FIG. 1 is a block diagram of prior art DPCM compression apparatus.

In FIG. 1, video signals generated by, for example, a camera are applied to a recursive noise reducer 10 which conditions the video signals for compression. The remaining apparatus is of relatively well known configuration, hence only a general description will be provided. I frame pixel data from the noise reducer 10, are passed unaltered to the encoder 15 by the subtractor 12. The encoder 15 performs a discrete cosine transform DCT on the pixel data (in blocks of 8×8 pixels) to generate DCT coefficients. The coefficients are quantized to control the data rate and ordered in a predetermined sequence which tends to coalesce the majority of zero valued coefficients for efficient run-length coding. The encoder then run-length and statistically encodes the coefficients. The coded pixel representative data is applied to a formatter 19 which attaches information to indicate the source location of respective blocks within a frame, the coding type, (I, P, B), frame number, time stamps etc. according to the selected compression protocol, for example MPEG 2. The data from the formatter is applied to a transport processor 20 which segments the formatted data into payload packets of particular numbers of bits, generates identifiers to track the respective payloads, generates synchronization information and develops error correction/detection codes, and appends all of the latter to the respective payload packets to form transport packets. The transport packets are applied to an appropriate modem 22 for transmission.

The I compressed frames from the encoder 15 are applied to a decoder 16 which performs the inverse function of the encoder 15. For I compressed frames the output of the decoder 16 is a reproduced I frame. The decompressed I fame is passed unaltered by the adder 18 to the buffer memory 17 wherein it is stored for predictive compression of subsequent P and B frames. Predictive encoding of P and B frames is similar, and P frame compression will be discussed. The P image frame currently being compressed is applied to a motion estimator 14, which divides the frame into blocks of e.g., 16×16 pixels. The estimator 14 then searches the preceding I or P frame for a similar 16×16 block of pixels, and calculates a set of vectors which indicate the relative difference in spatial coordinates of the block in the current frame and the most nearly identical block in the frame being searched. Using this vector the corresponding block from the corresponding decompressed frame in buffer memory 17 is coupled to the subtractor 12 which subtracts the predicted block from memory 17, on a pixel by pixel basis, from the corresponding block of the current frame being decompressed. The differences or residues provided by the subtractor are applied to the encoder 15 wherein they are processed similar to the I frame pixel data. The vectors generated by the estimator 14 are coupled to the formatter 19 wherein they are included as a portion of the coded data associated with respective blocks.

The compressed P frames are decoded in the decoder 16 and applied to the adder 18. Concurrently the respective blocks of the image frame from which the frame was predicted are accessed from the buffer memory by the predictor 13 and applied to a second input of the adder 18 wherein the decoded residues or differences are added on a pixel by pixel basis to restore the actual image. The restored pixel P frame data from the adder 18 is stored in the buffer memory 17 for predictively encoding/decoding subsequent P and B frames.

It is important to note that when I frames are being processed, the predictor 13 applies zero values to both the subtractor 12 and the adder 18. I frames that are input are therefore passed unaltered by the subtractor 12, and decoded I frames from the decoder 16 are passed unaltered by the adder 18.

Figure 2:
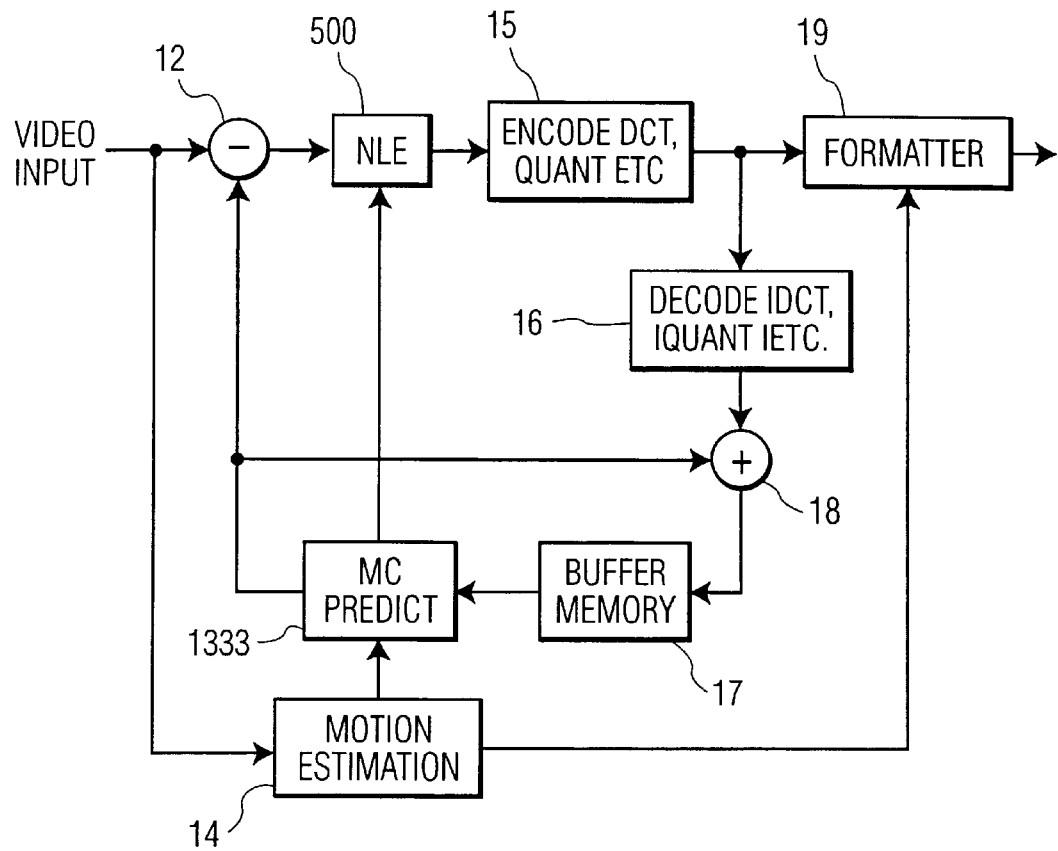
FIGS. 2 and 4 are block diagrams of alternative compression apparatus including noise reduction apparatus according to the present invention.

FIG. 2 illustrates a first embodiment of the invention. In FIG. 2 the compression apparatus is similar to the apparatus of FIG. 1 and elements designated with like numbers as those in FIG. 1 perform like functions. There are two primary differences which are the addition of the non linear element 500, and a slight additional function added to element 1333 which performs the function of element 13 in FIG. 1.

Figure 3:
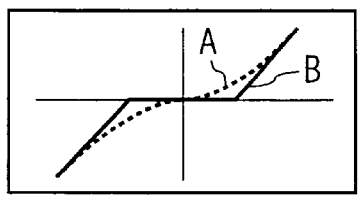
FIGS. 3 and 5 are pictorial diagrams of exemplary nonlinear transfer functions for the noise reduction apparatus of FIGS. 2 and 4.

The non linear element 500 is connected between the subtractor 12 and the encoder 15. This element is arranged to pass only signal values above a predetermined value. Element 500 may be a simple coring circuit which passes a zero value for all values below a predetermined value and the signal value minus the predetermined value for all values exceeding the predetermined value, as shown by the piece wise linear function (curve B) in FIG. 3. Alternatively it may take the form of a more typical coring circuit which passes a zero value for all signal values less than a predetermined value and the signal value for all signal values which exceed the predetermined value. A further alternative function for element 500 may be a more gently curving function such as the curve designated A in FIG. 3.

Figure 6:
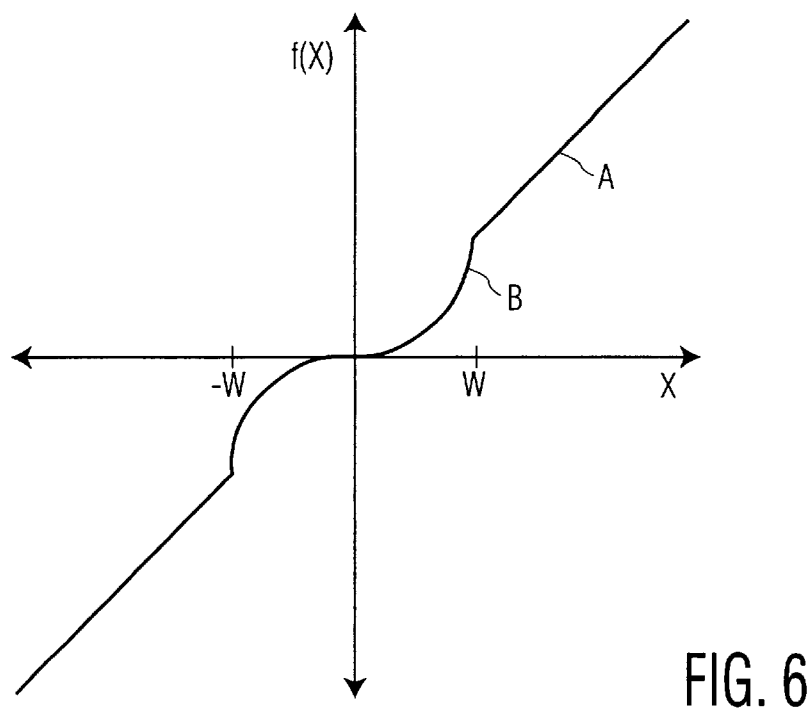
FIGS. 6 and 7 are pictorial diagrams of exemplary non-linear transfer functions, according to the invention, for the noise reduction apparatus of FIGS. 2 and 4.
Figure 7:
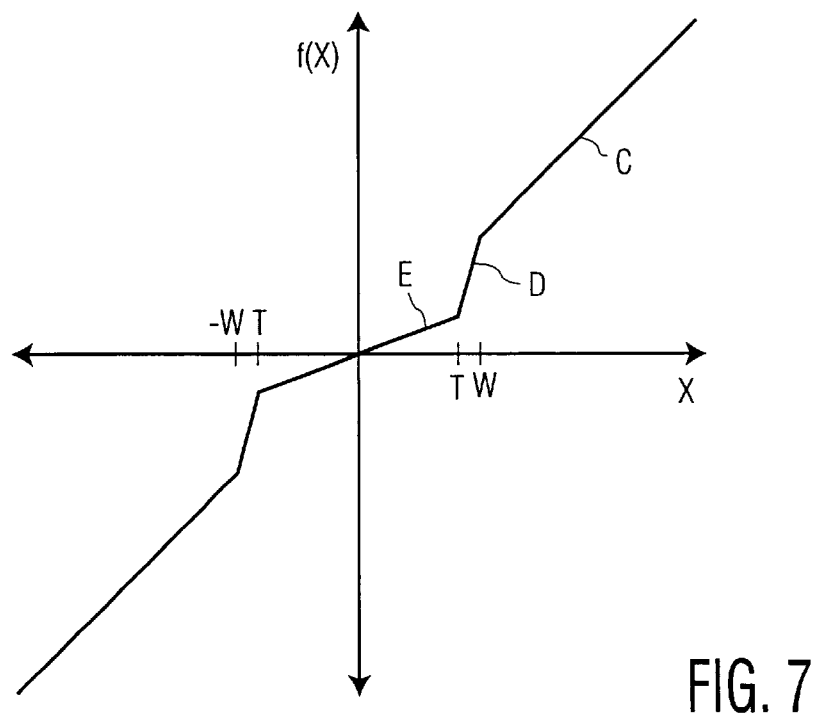

Additional exemplary alternative nonlinear transfer functions, according to the invention, that offer an advantage in noise filtering are shown in FIGS. 6 and 7. It is desirable that a nonlinear element transfer function should provide an identity function (in which the output is equal to the input) outside the coring 'window' region (W to −W in FIGS. 6 and 7). It is also desirable that a nonlinear element transfer function provides a smooth transition between coring and non-coring region. Otherwise, image distortions may result from the absence of these two coring features. A nonlinear transfer function, according to the invention, that provides these features is the class of functions that provide (a) an identity function outside the coring window and (b) a convex-downward and increasing function inside the coring window. The class of functions providing the desired nonlinear transfer functions are given by, $$f(x)=x$$

when, $|x|>W$ $$f(x)=g(x)$$

when, $|x| \leq W$ where $g(x)$ is both an increasing and convex-downward function of x (e.g. $x^2$), and $g(W)=W$.

The curve of FIG. 6 is defined as, $$f(x)=x$$

when, $|x|>W$, curve A of FIG. 6

$$f(x) = W\left(\frac{x}{W}\right)^n$$

when, $|x| \leq W$, curve B of FIG. 6
where n is an integer and controls the convexity of the coring function within the coring window ($|x| \leq W$). A larger value of n makes the coring function curve B becomes more convex and closer to zero within the region $|x|<W$. If n=1, the coring function becomes an identity function.

The curve of FIG. 7 is a piece-wise linear and convex exemplary implementation of the described function class. The curve of FIG. 7 is defined as, $$f(x)=x$$

when, $|x|>W$, curve C of FIG. 7

$$f(x)=ax$$

when, $|x|<T$, curve E of FIG. 7

$$f(x)=bx$$

when, $T<|x|<W$, curve D of FIG. 7
where a<b and 0<T<W. The parameter T is a threshold value that controls the convexity of the coring function.

All of the described functions may be provided by programming the functions into respective address locations in memory in unit 500 which is arranged to be addressed by the signal to be processed. The memory of nonlinear element 500 may be programmed with a number of different transfer functions and the transfer function may be selected in response to a control signal from prediction unit 1333, as described later. Other methods of selecting a transfer function are described, for example, in U.S. Pat. 5,258,928, by Zdepski et al. In addition, the described class of nonlinear functions, according to the invention, are suitable for filtering and noise reduction in a wide variety of applications. Not just the described video encoder in-loop coring system. Potential applications include satellite, terrestrial and cable systems for communication or broadcast and include telephony. For example, the functions may be used for still image compression, modems or speech compression.

In FIG. 2 the compressor performs two types of compression, intraframe and interframe. In the latter type the signal applied to the element 500 are residues resulting from taking pixel differences of two independent frames. In the former, the signal applied to the element 500 is the video signal unaltered. The noise power of the latter is the square root of two greater than the former, and the signal level of the latter is significantly less. Therefore the signal to noise ratio of the intraframe video signal is significantly greater than the signal to noise ratio of the interframe residues, regardless of the amount of noise contaminating the signal.

In view of the difference in signal to noise ratios, the nonlinear function applied during intraframe compression should be different than for interframe compression. For example, if the nonlinear function is piece wise linear coring, the predetermined value below which intraframe values will be cored may be significantly greater than for interframe residues. Alternatively, since the signal to noise ratio of intraframe signals will be relatively large compared to the residues, the nonlinear element may be conditioned to pass intraframe signals unaltered. The relative signal to noise ratios of B frame and P frame predictive coded frames may also be significantly different depending upon the number of B frames between P frames. Thus it may be appropriate to apply different nonlinear functions in element 500 for the different types of predictive coding. Adaptively controlling the nonlinear element is performed by the predictor 1333, which applies respective control signals for I, P and B frames being coded.

In addition, the inventors have recognized that noise in an incoming video signal from a source such as a camera may vary over time (e.g. frame to frame) as a result of various factors including an operational change such as a panning maneuver for example. Further, noise in the incoming signal may vary within portions of an image frame due to a scene change, for example. Therefore the inventors have recognized that it is advantageous to change the nonlinear element function based on an estimate of image noise. This is discussed in more detail later.

Figure 4:
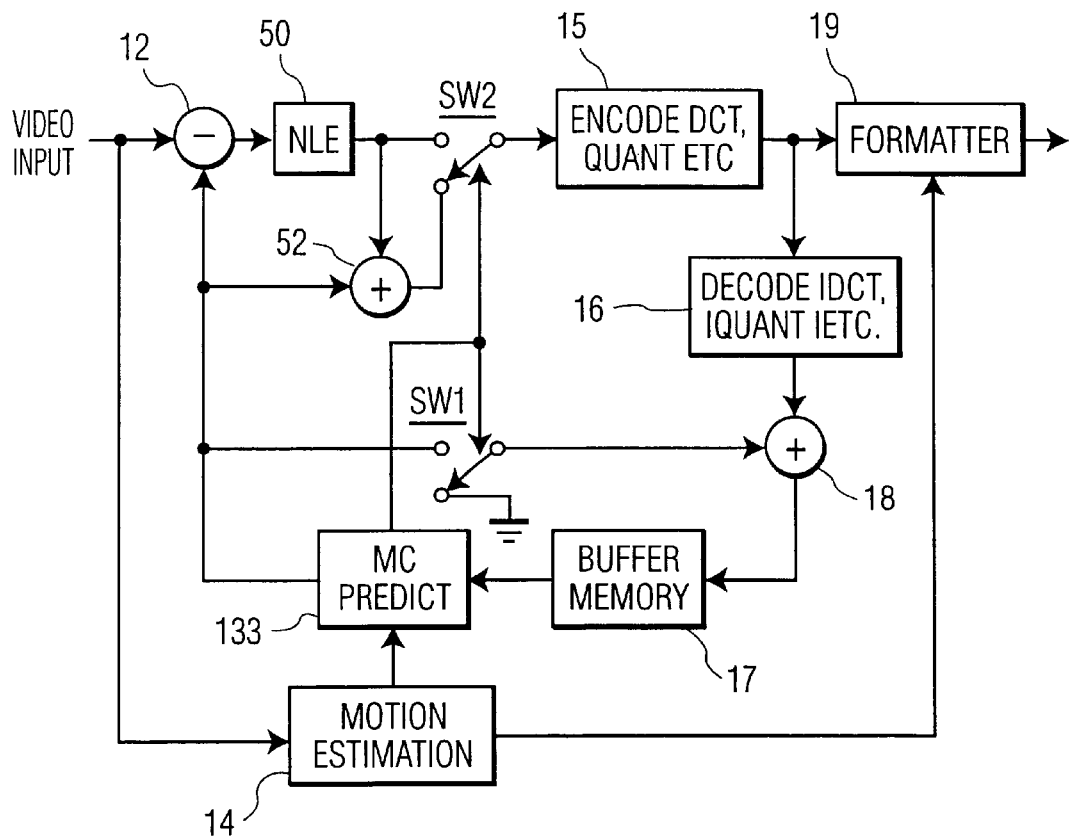
Figure 5:
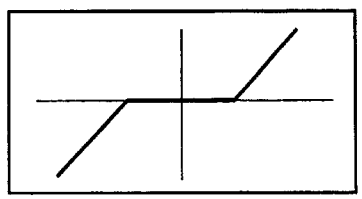

FIG. 4 shows an embodiment conducive to using a similar nonlinear function for all types of compression interframe and intraframe. In FIG. 4 elements designated with like numbers to elements in FIG. 1 are similar and perform like functions. The FIG. 4 circuit includes a nonlinear element 50 between the subtractor 12 and the encoder 15. The function of the nonlinear element may be similar to that shown in FIG. 5 (standard coring function) or a function as described for element 500.

During compression of interframe frames, the switches sw1 and sw2 are in the alternative position to the positions illustrated. With the switches in this position, the system is configured as and operates exactly as the system of FIG. 2 for interframe coding. Thus the nonlinear function of element 50 will be selected in accordance with performance expectations for interframe coding.

For intraframe coding it is necessary that the decoded intraframe signal from decoder 16 pass through the adder 18 unaltered. This is effected by employing switch sw1, which is conditioned by the prediction element 133, to pass zero values during coding of I frames. Concurrently the switch SW2 is moved to the position shown in FIG. 4.

In order for the nonlinear element to have a beneficial effect on I frame signals, in view of their relatively high signal to noise ratio, the I frame signals are artificially reduced for noise processing and then restored after noise processing. Reduction of the I frame signal is accomplished by generating a predicted I frame and applying the predicted I frame to the subtractor 12. The differences generated by the subtractor will be of the same order of magnitude as the interframe residues, and therefore the nonlinear element will operate similarly thereon. The predicted signal provided from the predictor 133 is then added back to the signal provided from the nonlinear element to restore the input I frame signal to substantially its original value.

Several methods are available to generate predicted I frames. One method is simply to condition the predictor 133 to output blocks of pixels which are collocated with the current I frame, from the last decoded frame in the buffer 17 (which may not be an I frame). But a preferred method, which provides a much more accurate prediction of the I frame is to predict the I frame in a manner similar to predicting P or B frames. Note that prediction requires motion vectors which provide a spatial correspondence between similar blocks of pixels in temporally spaced frames. Coded I frames in general do not include motion vectors. However, since the encoder includes the motion vector generation apparatus for generating vectors for P and B frames, it is a simple matter to program such apparatus to generate motion vectors for I frames also. These motion vectors may be utilized, at the encoder to generate a predicted I frame for noise reduction purposes, and then discarded, i.e. not included in the coded bit stream. Alternatively the I frame motion vectors may be included in the coded bit stream for error concealment purposes as suggested in the MPEG protocol.

Assume the nonlinear element 50 is programmed to pass all signal samples having magnitudes greater than a value of T, which will be nominally quite small. Also assume that the signal provided from the predictor is S(n) and the input I frame signal is I(n). Ignoring the element 50, the signal provided to the upper contact of the switch SW2 is I(n)−S(n). This signal is coupled to one input of an adder 52 and the signal S(n) is applied to a second input of the adder 52. Adder 52 provides the signal I(n)−S(n)+S(n)=I(n). These values are coupled to the encoder 15, and are unchanged from the input values. Only those output values I(n) for which the differences provided by the subtractor 12 are within ±T will be affected by the nonlinear element 12. Hence it will be beneficial if the I frame predictions provided by the predictor 133 are very accurate i.e. within a deviation of ±T, in which case the non linear element 50 will substantially only affect noise components.

The foregoing description assumes that frames are encoded in their entirety as intraframe coded frames or as interframe coded frames. In the MPEG standard, for example, the video signal is coded on a block-by-block basis, and provision is made to code certain blocks of P or B frames in the intraframe coding mode if a close match cannot be found for the block in the search frame. In these instances the predictors 13, 133, and 1333 will be programmed to switch the nonlinear processing elements 15, 50 and 500 respectively on a block-by-block basis in accordance with the current processing type. Thus, in the appended claims, if mention is made about compressing frames according to an interframe processing mode, it should be appreciated that ones of the blocks of pixels within such frames may be intraframe processed, and the claims are intended to apply to such mixed mode processed frames.

As previously mentioned, the inventors have recognized that it is advantageous to change the nonlinear element transfer function based on an estimate of image noise.

Further, that the nonlinear element transfer function is advantageously changed to adapt the encoder for signal to noise ratio changes that occur frame to frame and within a frame. Such signal to noise ratio changes may be the result of a camera panning maneuver or a scene change, for example. In addition, an inverse relationship has been identified between image noise and the degree of motion within an image area, according to the invention. A similar inverse relationship has been identified, according to the invention, between image noise and the complexity of motion within an image area. There is also an inverse relationship between the desired coring width, for example, and the degree and complexity of image motion.

In the encoder embodiment of FIG. 2, prediction unit 1333 comprising Motion Compensated predictor 1335, noise estimator 1337, and filter 1339 estimates the noise associated with a current pixel block being encoded. Based on this noise estimate, unit 1333 adapts the coring width of a coring function in unit 500 (as exemplified in FIG. 6), via a control signal, in order to filter residues from subtractor 12. Unit 1333 adapts the coring width for pixel blocks being encoded in P or B frames at selectable intervals. However, unit 500 passes I frame pixel blocks unaltered. The noise estimation and nonlinear element update operations are performed by unit 1333 as explained below. The remaining encoder operation is as previously explained in connection with FIG. 2.

Unit 1333 examines the motion vector provided by motion estimator 14 for the pixel block currently being encoded (current block). When this motion vector is substantially zero and the prediction error of the current block is below a predetermined threshold, the noise estimate is calculated. The nonlinear element transfer function of unit 500 is changed based on this noise estimate. By calculating the noise estimate only upon the concurrence of a substantially zero value motion vector and a low prediction error, the accuracy of the noise estimate is improved. This is because the error associated with large scene changes that coincide with zero value motion vectors is reduced. The prediction error is computed as the Mean Squared Error (MSE) for the current block. For example, in a macroblock containing N pixels where each pixel has a luminance value defining the pixel brightness (gray shade assuming a black and white picture), the MSE value would be given by:

$$MSE \doteq \frac{1}{N}\sum_{i=1}^{N}(\hat{u}_i - u_i)^2$$

where $u_i$ are the current block pixel luminance values and $\hat{u}_i$ are pixel luminance values corresponding to a predicted block for the current block. N equals the number of pixel luminance values in the current block, for example N=256 in the MPEG standard assuming a 16×16 pixel macroblock. A lower MSE value indicates a better prediction because it shows less volatility and less guesswork in the predicted values. The noise estimate σ is determined assuming that the MSE value is representative of image block noise given the concurrence of a substantially zero value motion vector and a low prediction error. The noise estimate σ is deduced as follows, $$\sigma = \left(\frac{MSE}{2}\right)^{\frac{1}{2}}.$$

The noise estimate ca values computed in a frame are averaged to produce a frame noise estimate value e. The σ values may also be filtered to provide a filtered and averaged frame noise estimate value for e. A final noise estimate used to update the unit 500 nonlinear element transfer function is then computed as a weighted average of the current and previous frame e values. The unit 500 nonlinear element function is updated at intervals of 10 frames in the preferred embodiment. However, the nonlinear element transfer function may be varied at selectable intervals ranging from many frames (greater than 10) to intervals corresponding to individual pixel block encoding periods. The selected interval may also be automatically determined based on the noise estimate variation being in a predetermined range.

The averaging of the frame noise estimate values is performed using the following Finite Impulse Response (FIR) filter function to provide the overall noise estimate value, ê, used to update the unit 500 nonlinear element transfer function;

$$\hat{e}_n = \sum_{j=0}^{N} h_j e_{n-j}.$$

The $\hat{e}_n$ summation is performed from 0 to N. The $e_{n-j}$ values represent previous frame noise estimates, j=N and corresponding $e_{n-N}$ is the noise estimate value of the frame occuring N frames prior to a current frame, j=0 and corresponding $e_n$ is the noise estimate value of the current frame. Specifically, where only a single previous noise estimate is used, as in the preferred embodiment, $\hat{e}_n$ is given by:

$$\hat{e}_n = \alpha e_n + (1-\alpha)e_{n-1}$$

where α is an empirically determined constant value of about 0.8 in the exemplary preferred embodiment.

The weighting factor values $h_j$ may also be dynamically determined and updated using a confidence measure of the current noise estimate. For example the 'h' factor may be determined as a function of a zero-value motion vector area relative to the whole image area or as a function of motion vector values.

The coring window width, w, of the unit 500 nonlinear element coring function is determined in accordance with the following equation, $$w = c\hat{e}_n + k$$

where c is an empirically determined fixed weighting constant with a value between 0 and 1. The constant k is dependent on scene content and is determined empirically based on measurements of encoder statistics including motion vectors, correlation factors and complexity factors. The value of k may be determined, for example, by iteratively encoding test video data using alternative k values. The k value that gives the best correlation between original and decoded test picture blocks in terms of Signal to Noise Ratio is selected for encoder use. The coring width w is computed to optimize Signal to Noise Ratio and minimize signal corruption.

It should be noted that a wide variety of other methods of obtaining a noise estimate may also be used. These methods may involve variation in the method of obtaining the noise estimate and filtering this estimate. For example, the noise estimate may be made using pixel by pixel noise estimates or frame noise estimates. Noise estimation is not restricted to fixed size pixel block based computation. There are various ways of applying the noise estimate to change the nonlinear element transfer function. The noise estimate may be used to select between different parallel transfer functions rather than to vary an individual function, for example.

An alternative method of obtaining a noise estimate is to use the lowest MSE value obtained from motion estimator 14 as an indication of noise. In this approach the lowest MSE value obtained for pixel blocks in a frame is taken as the noise estimate. Ideally, the MSE value for pixel blocks in which no motion is present is zero, therefore, the minimum MSE value indicates residual mismatch between pixel blocks resulting from noise. Therefore, this minimum MSE value may be taken as a noise estimate. This method is equally applicable to other indications of prediction error not just MSE. For example, the noise estimation method may alternatively use other types of error indication measures including MAE (Mean Absolute Error) and SAE (Sum of Absolute Error). Further, to reduce errors that may result from in-frame poor motion estimates the minimum MSE value may be filtered over a number of frames. This may be performed using a non-linear recursive type filter defined as follows:

$$L_n = \alpha L_{n-1} + (1-\alpha) M_n$$

where, $L_n$ is the filtered noise estimate output used to update the nonlinear element transfer function.

$L_{n-1}$ is the previous filtered noise estimate output.

$M_n$ is the smallest MSE value obtained for the current frame.

$\alpha$ lies between 0 and 1 and controls the time constant of the filter, $\alpha = A$ for $(L_{n-1} - M_n) > 0$ $\alpha = B$ otherwise.

Confidence in computation of a reduced noise estimate value relative to previous values is greater than confidence in computation of an increased noise estimate value. This is because an increased noise estimate value is more likely to result from spurious measurement error such as scene change effects, for example. Therefore the value of $\alpha$ is adjustable. The value of $\alpha$ is given value A to provide a longer (slower) filter time constant for increasing noise estimate values. The value of $\alpha$ is given value B to provide a shorter (faster) filter time constant for reducing noise estimate values. An exemplary value for A is 0.5 and an exemplary value for B is 0.1. More than the two adjustable filter time constants and other filter functions may also be used to optimize noise estimation for other image conditions.

The principles of the invention are also applicable to encoder systems using noise reducing pre-processors. In such pre-processors simplified motion detectors are commonly used that may produce significant motion estimation errors. Such systems particularly benefit from noise estimate filtering as previously described.

What is claimed is:

1. Apparatus for compressing an image representative video signal containing pixel data comprising:

means for estimating noise in said video signal and providing an output;

means for generating residues having lower and higher amplitude components, said residues representing differences of pixel values between predicted pixel values and real pixel values of a current frame of said video signal being compressed;

nonlinear processing means, coupled to said generating means, for attenuating lower amplitude residues greater than higher amplitude residues and providing processed residues at an output, wherein a transfer function of said nonlinear processing means is responsive to said noise estimate; and transform means for transforming said processed residues and providing a compressed video data output.

2. The apparatus set forth in claim 1 wherein said noise estimate is produced as a function of pixel prediction error.

3. The apparatus set forth in claim 2 wherein said noise estimate is produced when motion in an image area is substantially zero.

4. The apparatus set forth in claim 1 wherein said transfer function responds to said noise estimate at variable time intervals.

5. The apparatus set forth in claim 1 further including a filter with a variable time constant for temporally filtering said noise estimate and wherein said transfer function of said nonlinear processing means is responsive to said temporally filtered noise estimate.

6. The apparatus set forth in claim 5 wherein said variable time constant filter provides a longer (slower) filter time constant for increasing noise estimate values and a shorter (faster) filter time constant for reducing noise estimate values.

7. The apparatus set forth in claim 1 further including a filter for spatially filtering said noise estimate; and wherein said transfer function of said nonlinear processing means is responsive to said spatially filtered noise estimate.

8. The apparatus set forth in claim 1 wherein said transfer function is a coring function with a coring window, said window having a width w for attenuating said lower amplitude residues, and w is responsive to said noise estimate.

9. The apparatus set forth in claim 1 wherein said apparatus processes said pixel data on a block by block basis and the degree of coring within a coring function is responsive to motion in a pixel block.

10. The apparatus set forth in claim 1 wherein said apparatus processes said pixel data on a block by block basis and said a coring function is applied only to residues corresponding to pixel blocks exhibiting image motion below a predetermined threshold.

11. The apparatus set forth in claim 1 wherein said noise estimate is inversely related to the degree of motion in an area of an image.

12. The apparatus set forth in claim 1 wherein said nonlinear processing means provides a plurality of selectable transfer functions including a linear transfer function.

13. The apparatus set forth in claim 1 wherein said transfer function is a coring function with a coring window and said coring function is a function of a change in image content of said current frame.

14. The apparatus set forth in claim 1 wherein said transfer function is a coring function with a coring window and said coring function substantially comprises an identity function outside said coring window.

15. The apparatus set forth in claim 1 wherein said transfer function is a coring function with a coring window and said coring function substantially comprises a convex-downward and continuously increasing function inside said window.

16. Apparatus for filtering noise in a signal comprising:

an input processor for receiving and processing said signal to provide an output suitable for filtering; and a nonlinear processing means, coupled to said input processor, for attenuating lower amplitude components of said processed output more than higher amplitude components and for providing a filtered output, wherein the transfer function of said nonlinear processing means is in the class of coring functions, having a coring window, that substantially provide:

(a) an identity function, in which the output is equal to the input, outside said coring window; and (b) a convex-downward and continuously increasing function inside said coring window.

17. The apparatus set forth in claim 16 wherein said transfer function is adaptively selected from a plurality of coring functions that include a transfer function in said class.

18. The apparatus set forth in claim 17 wherein said transfer function is selected based on an estimate of noise in said video signal.

19. The apparatus set forth in claim 16 wherein said transfer function is a piece-wise linear transfer function.

20. The apparatus set forth in claim 16 wherein said transfer function is represented by (f(x)) and inside said coring window is of the form $$f(x) = W\left(\frac{x}{W}\right)^n$$

where n is an integer and W is a coring window width for attenuating said lower amplitude components and the magnitude of x is less than or equal to W.

21. Video signal compression apparatus comprising:

means for estimating noise in a video signal and providing an output;

nonlinear processing means for adaptively filtering said video signal with a coring function and providing a filtered video output signal, said coring function substantially providing a convex-downward and continuously increasing function inside a coring window of said coring function, wherein said coring function is responsive to said noise estimate; and transform means for compressing said filtered video output signal to provide a compressed video data output.

* * * * *